US00RE37948E

(19) United States
(12) Reissued Patent
Sakaguchi et al.

(10) Patent Number: US RE37,948 E
(45) **Date of Reissued Patent: *Dec. 31, 2002**

(54) VIDEO GAME APPARATUS, METHOD AND DEVICE FOR CONTROLLING SAME, AND MEMORY CARTRIDGE FOR VIDEO GAMES

(75) Inventors: Hironobu Sakaguchi, Tokyo (JP); Hiroyuki Itou, Tokyo (JP)

(73) Assignee: Square Co., Ltd., Tokyo (JP)

( * ) Notice: This patent is subject to a terminal disclaimer.

(21) Appl. No.: 09/358,681

(22) Filed: Jul. 21, 1999

Related U.S. Patent Documents

Reissue of:
(64) Patent No.: 5,649,862
Issued: Jul. 22, 1997
Appl. No.: 08/286,188
Filed: Aug. 5, 1994

U.S. Applications:
(62) Division of application No. 07/852,057, filed on Mar. 16, 1992, now Pat. No. 5,390,937.

(30) Foreign Application Priority Data

Jul. 16, 1991 (JP) ..... 3-199828

(51) Int. Cl.[7] ..... A63F 9/24
(52) U.S. Cl. ..... 463/43; 463/1; 345/418
(58) Field of Search ..... 463/7–8, 30–31, 463/36–38, 44, 43; 700/91; 340/323 R; 345/418

(56) References Cited

U.S. PATENT DOCUMENTS 4,352,492 A * 10/1982 Smith
4,357,014 A * 11/1982 Baer et al.
4,657,247 A * 4/1987 Okada
4,738,451 A * 4/1988 Logg
4,752,069 A * 6/1988 Okada
4,981,296 A * 1/1991 Shiraishi et al.
5,112,051 A * 5/1992 Darling

OTHER PUBLICATIONS

"Advanced Dungeons & Dragons Players Handbook", by Gary Gygax, Copyright by TSR Games, 1978; pp. 11, 36–39, 43, 100–105.*
"Command HQ", by Dan Bunten, Copyright by MicroProse Software, 1990; Technical Supplement pp. 3 and HQ Control Summary Card pp. 1–2.*
"Power Monger", by Bullfrog Productions, Copyright by Electronic Arts, 1990; p. 13.*
"Champions: The Super Hero Role Playing Game", by Steve Peterson and George MacDonald, Copyright 1981; pp.7–11, 13, 14, 50–53, 55, and Game Master Screen pp. 1–2.*
Advanced Dungeons & Dragons Dungeon Masters Guide, by Gary Gygax, Copyright—1979, TSR Games, pp. 61–67 and 71.*
Bard's Tale Manual and Command Summary, by Michael Cranford and Bing Gordon, Copyright—1985, Electronic Arts, pp. 1–5 of Command Summary.*
Dark Heart of UuKrul Player's Guide, by Ian Boswell and Martin Buis, Copyright—1989, Broderbund Software, Inc. and Digital Studios, Ltd, pp. 29–31.*
Wizard's Crown Rule Book, Strategic Simulations, Inc, Copyright 1985, pp. 19–21.*
"Runefuest", by Steve Perrin and Ray Turney, Copyright by Chaosium, Inc., 1978, pp. 3, 8–11, 15–17, 19–22, 25, 33, 35 and Tables A, B, F and G.*

* cited by examiner

*Primary Examiner*—Mark Sager
(74) *Attorney, Agent, or Firm*—McDermott, Will & Emery

(57) ABSTRACT

Disclosed in a video game of enhanced realism in which actual combat is closely simulated. The game is so adapted that an enemy character on a display screen may launch an attack against a player character on the same screen, even while the player character is the process of inputting a command, at elapse of a set time period specific to the enemy character. The attack is made without an interruption in the flow of time of the game.

12 Claims, 20 Drawing Sheets

Fig.4a

| | | |
|---|---|---|
| PLAYER CHARACTER aaa | STANDBY-TIME COUNTER | FLAG |
| | ACTION PREPARATION -TIME COUNTER | FLAG |
| | ⋮ | |
| PLAYER CHARACTER ccc | STANDBY-TIME COUNTER | FLAG |
| | ACTION PREPARATION -TIME COUNTER | FLAG |
| ENEMY CHARACTER AAA1 | STANDBY-TIME COUNTER | FLAG |
| | ACTION PREPARATION -TIME COUNTER | FLAG |
| | ⋮ | |
| ENEMY CHARACTER AAA3 | STANDBY-TIME COUNTER | FLAG |
| | ACTION PREPARATION -TIME COUNTER | FLAG |

Fig.4b

| |
|---|
| INPUTTED COMMAND |

Fig.5a

| |
|---|
| ACTIVE / WAIT |
| "MAGIC" OR "ITEM" |
| COMMAND-INPUT ENABLE |
| COMMAND-INPUT COMPLETE |
| FLAG AREA |

Fig.5b

| CHARACTER | HIT POINTS | MAX VALUE |
|---|---|---|
| a a a | 2 0 3 3 | 2 0 3 3 |
| b b b | 2 0 8 0 | 2 4 2 0 |
| c c c | 1 3 6 0 | 1 3 6 0 |
| | | |
| A A A 1 | 1 5 0 0 | 1 5 0 0 |
| A A A 2 | 1 4 0 0 | 1 6 0 0 |
| A A A 3 | 1 8 0 0 | 1 8 0 0 |
| | | |

Fig.6a

| BASIC VALUE OF AGILITY(STANDBY TIME) | |
|---|---|
| a a a | AGILITY COEFFICIENT |
| b b b | AGILITY COEFFICIENT |
| c c c | AGILITY COEFFICIENT |
| | |
| A A A 1 | AGILITY COEFFICIENT |
| A A A 2 | AGILITY COEFFICIENT |
| A A A 3 | AGILITY COEFFICIENT |

Fig.6b

| BASIC VALUE OF ACTION PREPARATION TIME | |
|---|---|
| TYPE OF ACTION | COEFFICIENT OF ACTION PREPARATION TIME |
| | |
| | |
| | |
| | |
| | |
| | |
| | |

VIDEO GAME APPARATUS, METHOD AND DEVICE FOR CONTROLLING SAME, AND MEMORY CARTRIDGE FOR VIDEO GAMES

Matter enclosed in heavy brackets [ ] appears in the original patent but forms no part of this reissue specification; matter printed in italics indicates the additions made by reissue.

This application is a division of application Ser. No. 07/852,057 filed Mar. 16, 1992, U.S. Pat. No. 5,390,937.

BACKGROUND OF THE INVENTION

1. Field of the Invention

This invention relates to a video game apparatus for realizing a role-playing game (RPG) of the type in which a player character, rather than the player, repeatedly battles with an enemy character on a video screen. The invention relates also to a method and device for controlling the apparatus, and to a memory cartridge for the video game.

2. Description of the Related Art

Conventional role-playing games or battle games are of the type in which battle action proceeds in turns. Specifically, a player character and an enemy character are displayed on the display screen of a display unit (e.g., a television receiver). A plurality of attack types (inclusive of weaponry and magic) available to the player character are displayed on the display screen, and the player selects the desired type of attack from the displayed group. Upon making the selection, the player issues the proper instruction (command input) through an input unit referred to as a controller. The attack from the enemy character, on the other hand, is predetermined. When the input of the command is completed, the battle starts the player character and enemy character attack each other in accordance with a predetermined sequence. The incidents of damage sustained by each character owing to the attack by his adversary are counted, as by the low-point method of scoring. The game proceeds by repeating the input of commands and the combat between the player character and enemy character, and the player continues manipulating the apparatus in an effort to have the player character attain a prescribed goal (such as finding treasure or rescuing a screen).

In a video game of this type in which action proceeds in turns, the enemy character never launches an attack until the player has completed inputting the command for the player character. In addition, attacks proceed only in accordance with a predetermined sequence, and the sequence is an important factor for fighting a decisive battle. In a sense, therefore, the aforementioned game in which action takes place in turns in a static game and lacks realism.

SUMMARY OF THE INVENTION

Accordingly, an object of the present invention is to provide a video-game apparatus which approximates actual combat and excels in dynamism and realism, a method and device for controlling the apparatus, and a memory cartridge (or memory cassette) for such control.

In a video game apparatus in which a player character and an enemy character are displayed on a display screen of a display unit and the player character and enemy character carry out attacks on each other in dependence upon an inputted action command or a predetermined action command, a method of controlling the video game apparatus according to the present invention comprises steps of clocking a time, which has been stipulated for each character, from start of the game or from end of action of a character, and performing control in such a manner that when the stipulated time elapses, a transition is made to processing associated with an ensuing action of the character for which the stipulated time has elapsed.

In a video game apparatus in which a game is made to proceed upon displaying, on a display screen of a display unit, a player character which carries out an attack in response to an inputted action command and an enemy character which carries out an attack in response to a predetermined action command, a method of controlling a video game apparatus according to the present invention comprises the steps of clocking time, which has been stipulated for each character, with regard to at least the enemy character from start of the game or from end of attack by a character irrespective of input of the action command for the player character, and performing control in such a manner that when the stipulated time elapses, a transition is made to processing for starting an ensuing attack by the character for which the stipulated time has elapsed.

Further, according to the present invention, there is provided a video game apparatus having a control unit, a display unit and an input unit for displaying a player character and an enemy character on a display screen of the display unit, and causing the player character and enemy character to carry out attacks on each other in dependence upon an action command inputted from the input unit or a predetermined action command, comprising clocking means for clocking a time, which has been stipulated for each character, from start of the game or from end of action of a character, and control means for performing control in such a manner that when the stipulated time elapses, a transition is made to processing associated with an ensuing action for the character for which the stipulated time has elapsed.

Further, according to the present invention, there is provided a device for program control of a video game apparatus having a CPU for executing processing in accordance with a program, a memory for being used in program execution by the CPU, a display unit for displaying a video screen, a display processing unit which executes processing, under control of the CPU, for presenting a display on the display unit, and an input unit for inputting action commands.

The device for controlling the video game apparatus comprises means for displaying a player character and an enemy character on the display screen of the display unit, means for causing the player character to execute an action commanded in response to the action command inputted from the input unit, means for causing the enemy character to execute a predetermined action, means for counting a time, which has been stipulated for each character, from end of action of each character, and means for performing control in such a manner that when the stipulated time elapses, a transition is made to processing associated with an ensuing action for the character for which the stipulated time has elapsed.

Further, according to the present invention, there is provided a memory cartridge (or memory cassette) for program control of a computer for a video game having a CPU for executing processing in accordance with a program, a memory for being used in program execution by the CPU, a display processing unit for displaying a game video screen on a display unit under control of the CPU, and an input unit for inputting action commands.

The memory cartridge includes a memory in which there is stored a program for realizing, in cooperation with the CPU, processing for displaying a player character and an enemy character on the display screen of the display unit, causing the player character to execute an action commanded in response to the action command inputted from the input unit, causing the enemy character to execute a predetermined action, counting a time, which has been stipulated for each character, from end of operation of each character, and performing control in such a manner that when the stipulated time elapses, a transition is made to processing associated with an ensuing action regarding the character for which the stipulated time has elapsed.

In an embodiment of the present invention, the processing associated with the ensuing action regarding the player character includes display processing for presenting a screen which requests input of an action command, processing in which time for action preparations conforming to the type of action is clocked in response to an inputted action command, and processing for executing the commanded action when the time for action preparations elapses.

The processing associated with the ensuing action regarding the enemy character includes processing in which time for action preparations conforming to the type of action is clocked in response to a predetermined action command, and processing for executing the commanded action when the time for action preparations elapses.

In accordance with the invention, the clocking of time that has been stipulated for each character starts as soon as the attack by the character ends. When this time elapses, a transition is made to processing in which the character mounts an attack again. The arrangement is such that the enemy character launches an attack irrespective of whether the player has inputted a command for the purpose of manipulating the player character. Since this form of play closely resembles the form of actual combat, the game excels in realism and thrills and the player is capable of enjoying a speedy game development.

In another embodiment of the invention, an active mode and a wait mode are provided. When the active mode has been selected, the clocking processing continues without interruption, as described above. When the wait mode has been selected, the clocking processing is halted at least in part of a time period that is for the purpose of allowing the player to input a command. Accordingly, a player who is not accustomed to playing the game may select the wait mode to play the game in a way similar to that of the conventional game in which combat action takes place in turns.

In yet another embodiment of the invention, the speed of clocking in clocking processing is substantially changed in response to an input designating the speed of the passage of time. Accordingly, the player is capable of choosing the speed of the passage of time that matches his or her own ability. This makes the game even more enjoyable to play.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4*a* and 4*b* are diagrams showing part of the contents of a working RAM;

FIGS. 5*a* and 5*b* are diagrams showing part of the contents of a working RAM;

FIGS. 6*a* and 6*b* are diagrams showing part of the contents of a working RAM;

DESCRIPTION OF THE PREFERRED EMBODIMENT

Figure 1:
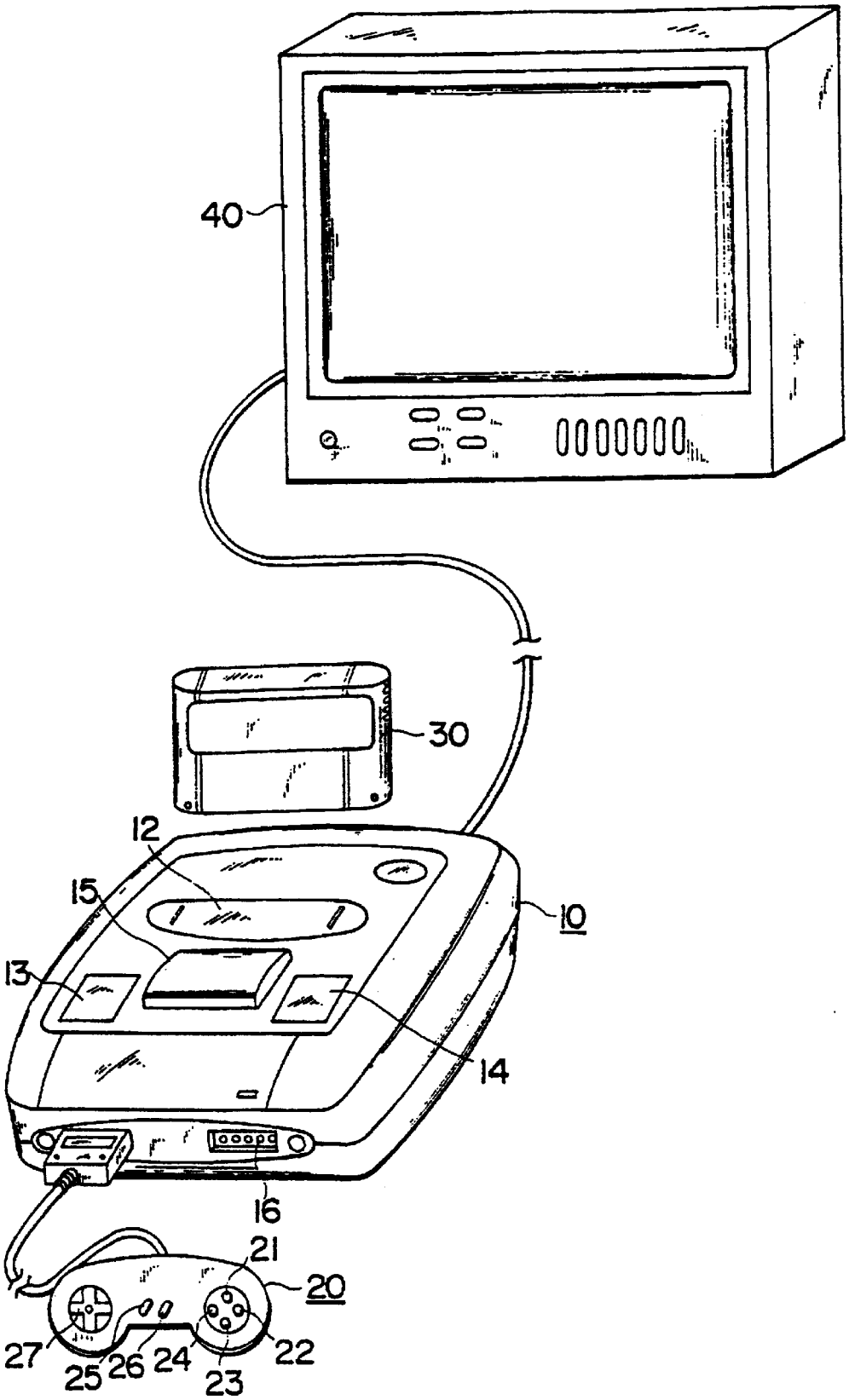
FIG. 1 is a perspective view showing the overall video game system according to the present invention.

FIG. 1 illustrates the entirety of the system for the video game.

The system comprises a game processor (the game device proper) 10, commonly referred to as a family computer (a super family-computer), a controller 20, which serves as an input unit or manipulating device, detachably connected to the game processor 10, a memory cartridge (or memory cassette) 30 removably inserted into the game processor 10, and a CRT display unit 40 (such as a television receiver or monitor display device), to which the game processor 10 is detachably connected, for presenting a video screen on which the game appears.

The game processor 10 has a central portion of the upper side of which has an insertion slot 12, equipped with a cover, into which the memory cartridge 30 is removably inserted. A connector 56 (see FIG. 2), to which the pins, conductive patterns or electrodes of the memory cartridge 30 are connected, is provided in the interior of the insertion slot 12. Provided in front of the insertion slot 12 are a power switch 13, a reset switch 14 and an eject button 15, which is for ejecting the memory cartridge 30. The front end of the game processor 10 is provided with connectors 16 to which the controller 20 is detachably connected.

The controller 20 is provided with an A button 21 for decision making, a B button 22 for cancelling purposes, an X button 23 for selecting a menu display, a Y button 24, a start button 25, a select button 26 and a joy pad (or joy stick)

27 for moving a cursor up, down, left and right on the display screen, as well as other buttons (not shown). In this embodiment, the A button 21, B button 22, X button 23 and the joy pad 27 are used in order to perform various input operations.

Figure 2:
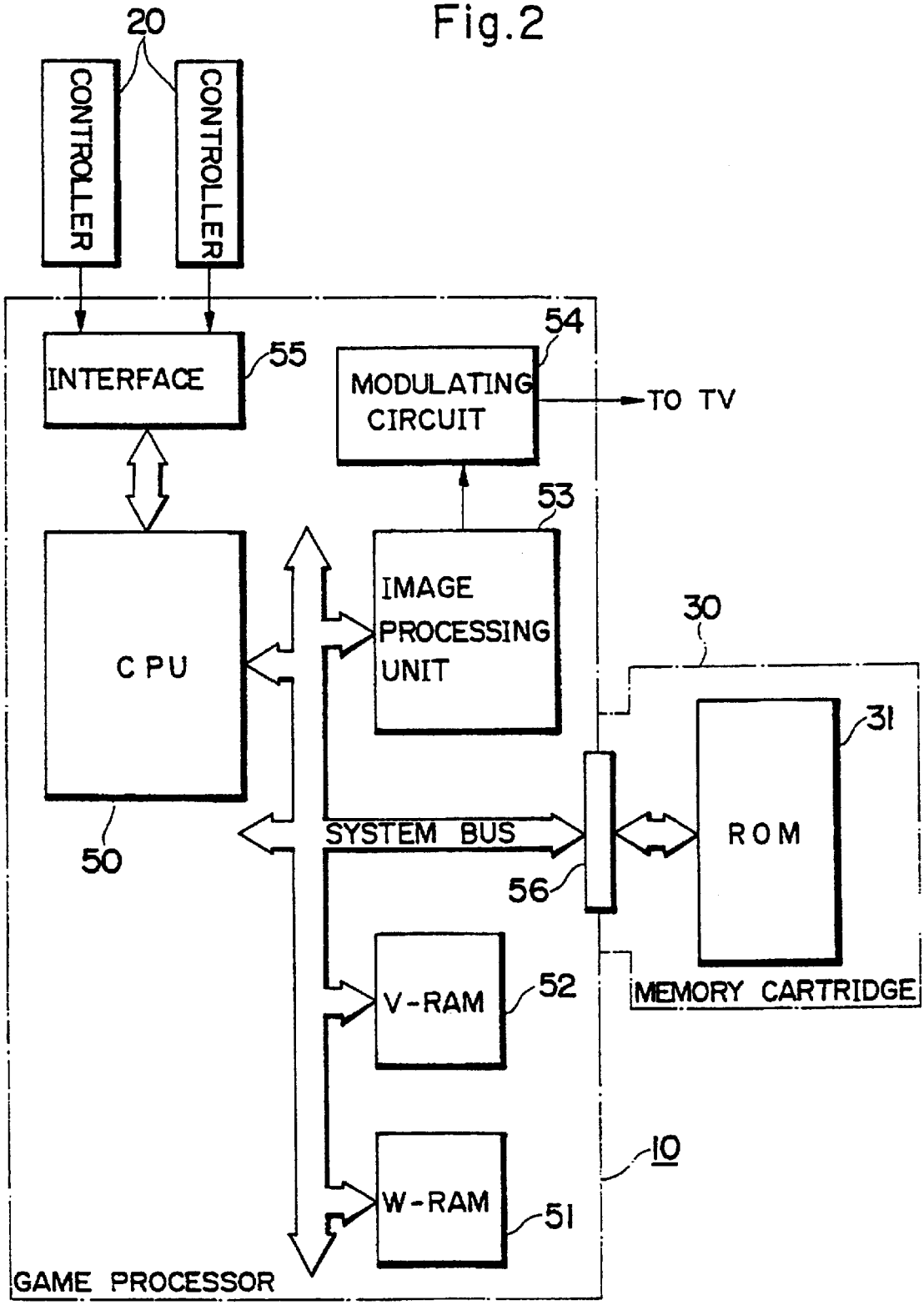
FIG. 2 is a block diagram showing the electrical configuration of a game processor.

FIG. 2 mainly illustrates the electrical configuration of the game processor 10 in simplified form. The game processor 10 includes a CPU (central processing unit) 50, which controls the overall operation of the video game. The execution program of the CPU 50 is stored beforehand in a ROM 31 incorporated in the memory cartridge 30. Data representing an image displayed on the display unit 40 also is stored in the ROM 31. The ROM 31 is connected to the CPU 50 by a system bus (inclusive of a data bus, address bus and control lines) through the connector 56 when the memory cartridge 30 is connected to the game processor 10. Preferably, there are provided a RAM for saving data such as the maximum value (MAX value) or present value (hit points) of the player character's survivability, described below, in order that the game may be continued at a subsequent time, as well as a battery for backing up the data stored in the RAM.

In the game processor 10, a working RAM 51 for storing various data during the progress of the game and for serving as a counter, a video RAM 52 for storing image data read out of the ROM 31 and subjecting the data to necessary processing, and an image processing unit 53 which creates a video signal for display purposes based upon the image data from the RAM 52 are connected to the CPU 50 by the system bus. The video signal outputted by the image processing unit 53 is applied to the display unit 40 upon being converted into a signal suitable for being supplied to the display unit 40, such as an NTSC television signal, by a modulating circuit 54.

One controller 20 (is only one player is playing the game), or two controllers 20 (if two are playing the game), is connected to the game processor 10, and the various signals from the controller 20 are inputted to the CPU 50 via an interface 55.

One or a plurality of player characters and one or a plurality of enemy characters appear on the screen of the display unit 40. The player character(s) is moved in accordance with an action command provided by the player via the controller 20. More specifically, the player selects the type of attack, etc., displayed on the screen of the display unit 40 (selection refers to as the inputting of a command), in response to which the player character acts to perform the selected attack, etc. The enemy character moves in accordance with a predetermined action command (a decision regarding battle operations). The movements of the player character and enemy character, i.e., their actions in combat, are executed repeatedly without interruption while time is passing at a fixed rate. This shall be referred to as "active time battle".

Figure 3:
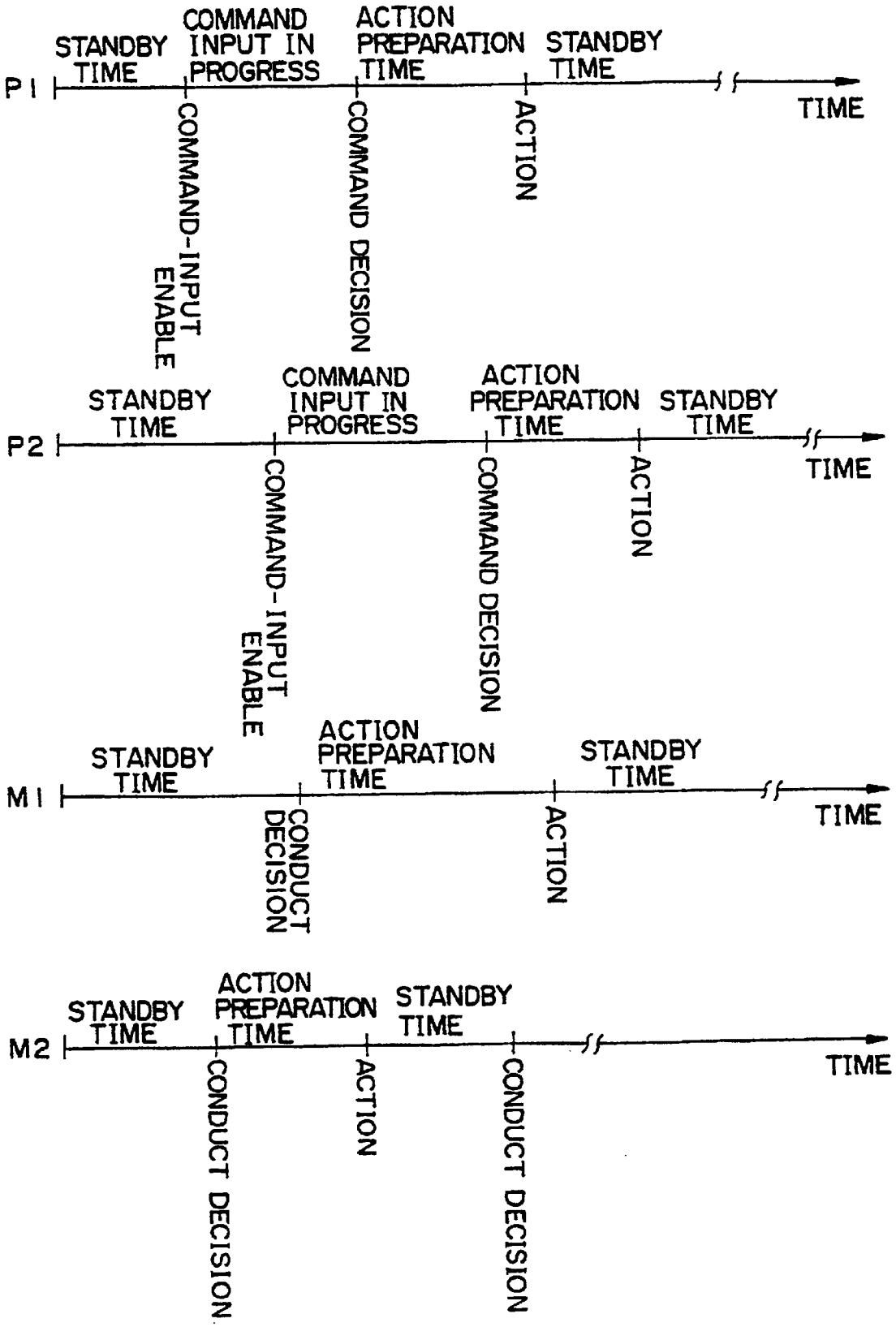
FIG. 3 is a diagram showing the concept of active time battle.

FIG. 3 illustrates the actions of the player character and enemy character in active time battle. In the illustrated example, the actions of two player characters P1, P2 and two enemy characters M1, M2 are shown.

The player characters P1 and P2 will be described first. At the start of the game of at the end of a combat operation such as an attack, a standby time that has been set for each character starts being clocked. The standby time represents the quickness and agility of the character. When the standby time elapses, the input of a command is allowed. At this point in time the player is capable of selecting a combat operation (making a command input) that is being displayed. When the command is inputted, the processing corresponding thereto is executed (this is a command decision) and then action preparation time for execution of the command starts being clock. Action preparation time is a time specific to the type of action and is set for each type of action. When this time elapses, the aforementioned action for the designated combat operation is initiated and then standby time starts being clocked again.

Input of commands is unnecessary for the enemy characters M1 and M2. When the standby time set for each enemy character and representing the quickness and agility of the character elapses, the conduct of the character is decided. Though the type of combat operation of an enemy character is predetermined, there are cases where the combat operation changes depending upon the circumstances, as will be described later. When the action preparation time regarding the conduct that has been decided elapses, the combat operation decided is carried out, after which the standby time starts being clocked again. The foregoing processing is repeated for the enemy characters.

In active time battle, as will be appreciated from FIG. 3, the standby times and action preparation times of the enemy characters M1 and M2 elapse from moment to moment (the clocking of these time periods continues without interruption) even while the players are making command inputs for the player characters P1 and P2 (i.e., while the players are considering how to maneuver the player characters through a combat operation). Accordingly, there are instances in which a player character sustains an attack from an enemy character even while a command input is being made. Thus, a game excelling in realism and thrills proceeds at a speedy pace in a mode approximating actual combat.

Theoretically, it will suffice if only standby time or action preparation time is set for an enemy character. However, it is preferred that both times by provided in a case where the type of combat operation (action or conduct) of an enemy character changes, in accordance with the program, depending upon the prevailing circumstances.

Figure 11:
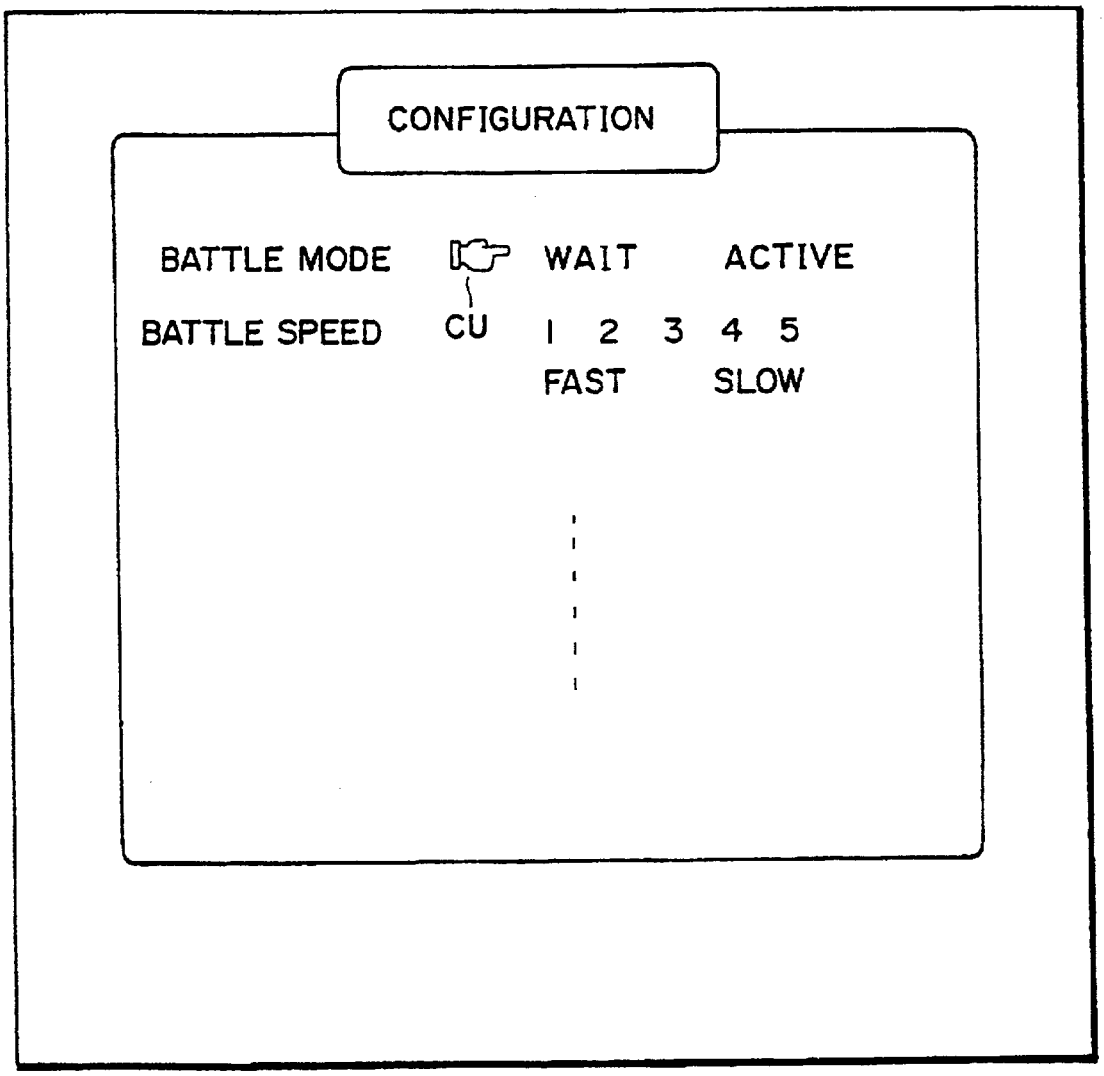
FIG. 11 is a diagram showing an example of a display screen presented on a display unit.

FIG. 11 illustrates an example of a menu screen displayed on the display 40. The menu screen is capable of being called by pressing the X button 23 on the controller 20. A cursor (or pointer) CU representing a pointing hand is displayed not only on the menu screen but also on other screens. The position of the cursor CU on the screen can be moved by the joy pad 27 on the controller 20. If the A button 21 is pressed after the cursor CU has been moved to a desired position, an item represented by the display indicated by the cursor CU is selected and inputted.

Battle mode and battle speed can be selected on the menu screen.

The battle mode includes a wait mode and an active mode. The wait mode is one in which the passage of time (i.e., the clocking operation) is suspended (in this embodiment, a case in which "MAGIC" or "ITEM" has been selected) with regard to a specific command input during a command input operation. Of course, it is permissible to halt the passage of time for all command inputs.

The active mode is one in which time is constantly passing, i.e., in which the clocking operation continues (even when a command input is in progress).

Battle speed means the speed at which time passes during the game. Specifically, the standby and action preparation times for all of the characters are varied in proportional fashion. In this embodiment, battle speed is capable of being set to five levels.

Figure 12:
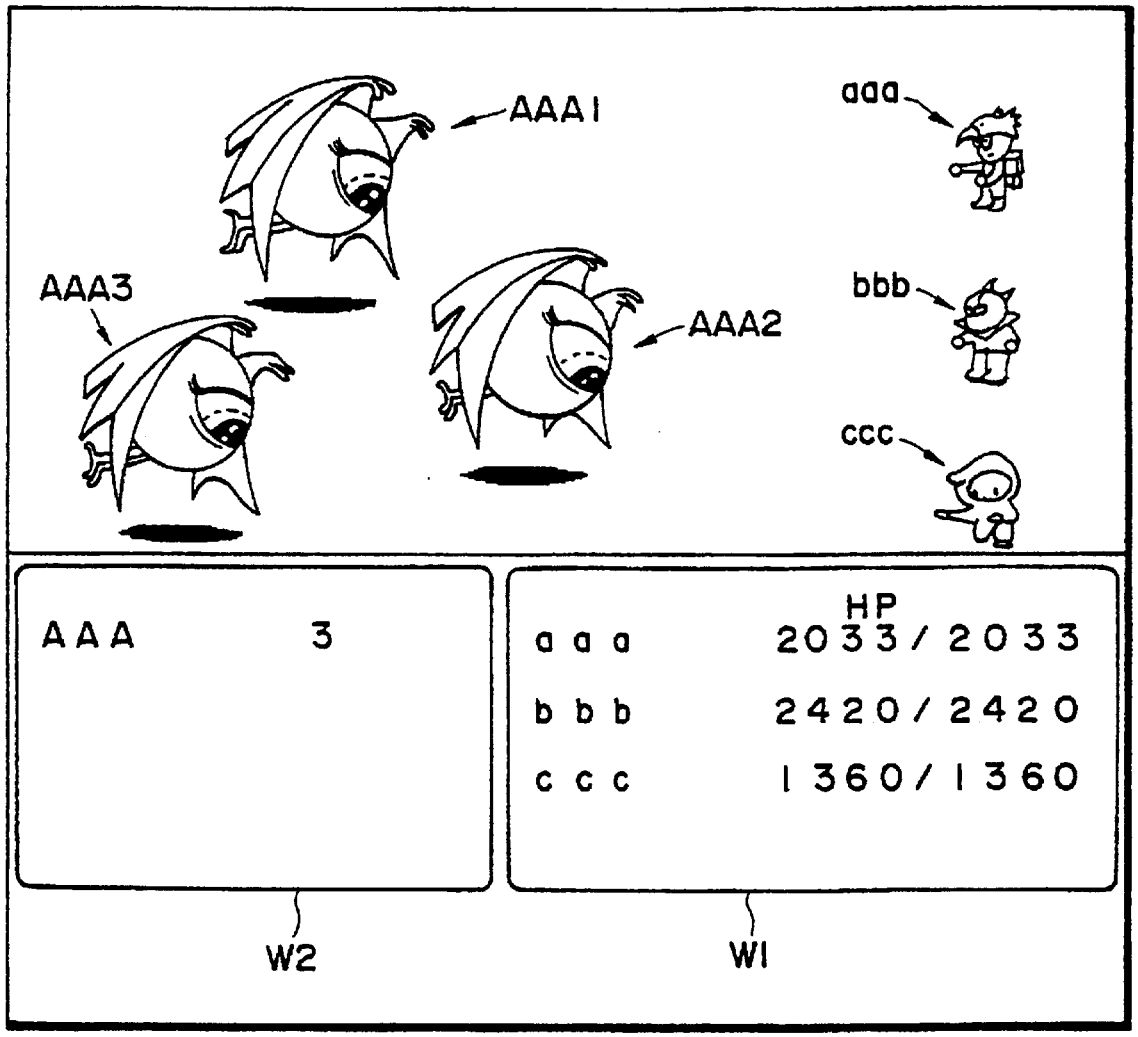
FIG. 12 is a diagram showing an example of a display screen presented on the display unit.

FIG. 12 illustrates an example of an initial screen. This screen is displayed when the game starts. In this example of the display, three player characters aaa, bbb, ccc of three types and three enemy characters AAA1, AAA2, AAA3 of one type appear. The lower half of the display screen is provided with two windows W1 and W2. The window W1 relates to the player characters and displays a numeral (a denominator) representing the MAX value (maximum value) of the survivability of each player character and a number (a numerator) representing the present survivability (hit points=HP) of each player character. The hit points are decremented in conformity with the type of attack sustained whenever an attack is received from an enemy character. It is shown in the window W2 that three enemy characters of type AAA appear.

FIGS. 4 through 6 illustrate various areas set in the working RAM 51 of the game processor 10. These areas are set or created in accordance with a program or data that has been stored in the ROM 31 of memory cartridge 30 at the start of the game, or they are created by loading the data that has been saved in the RAM of the memory cartridge 30.

FIG. 4*a* illustrates areas used as pairs of counters and flags. A standby-time counter and a action preparation-time counter are provided for each character, and each counter is equipped with a flag. Data representing standby time or action preparation time is loaded in the counters, and the value recorded in a counter is decremented at elapse of the fixed period of time. When a counter value is decremented down to zero, the corresponding flag turns on. A greater number of counters may be provided for each character.

FIG. 4*b* illustrates an area for storing a command inputted for a player character.

FIG. 5*a* illustrates a flag area. This flag area is provided with an active/wait mode flag which stores the set mode (the active mode or wait mode), a flag which turns on when "MAGIC" or "ITEM" has been inputted, a command-input enable flag which turns on when a player is allowed to make a command input (i.e., when standby time has elapsed), and a command-input completion flag which indicates that a player has inputted a command.

FIG. 5*b* illustrates an area for storing the MAX value and hit points of the survivability of each character. MAX values and hit points are provided not only for the player characters but also for the enemy characters. These values for the enemy characters are not displayed on the screen. When the hit points become zero, the player character faints and the enemy character vanishes from the screen.

FIG. 6*a* illustrates an area of data relating to standby time. As described above, standby time represents the quickness or agility of a character and is stipulated for each character. In this embodiment, a basic value of agility (standby time) common to all characters and an agility coefficiency that has been stipulated for each character are set. The value initially set in the standby-time counter of each character is obtained by multiplying the basic value by the coefficient of the character.

FIG. 6*b* shows a data area relating to action preparation time. Action preparation time is stipulated in dependence upon the type of action (attack, etc.). A basic value of action preparation time and a coefficient of action preparation time, which is for each type of action, are stipulated. The action preparation time for each type of action is calculated by obtaining the product of the aforementioned basic value and coefficient, and the calculated action preparation time is preset in the action preparation-time counter.

By changing the basic value of standby time and the basic value of action preparation time in dependence upon the set battle speed, the speed at which time passes can be altered even if the time interval at which the counter is decremented is fixed. Of course, a change of battle speed can be achieved also be altering the speed of counter decrementing processing, altering the aforementioned coefficient, etc.

Figure 7:
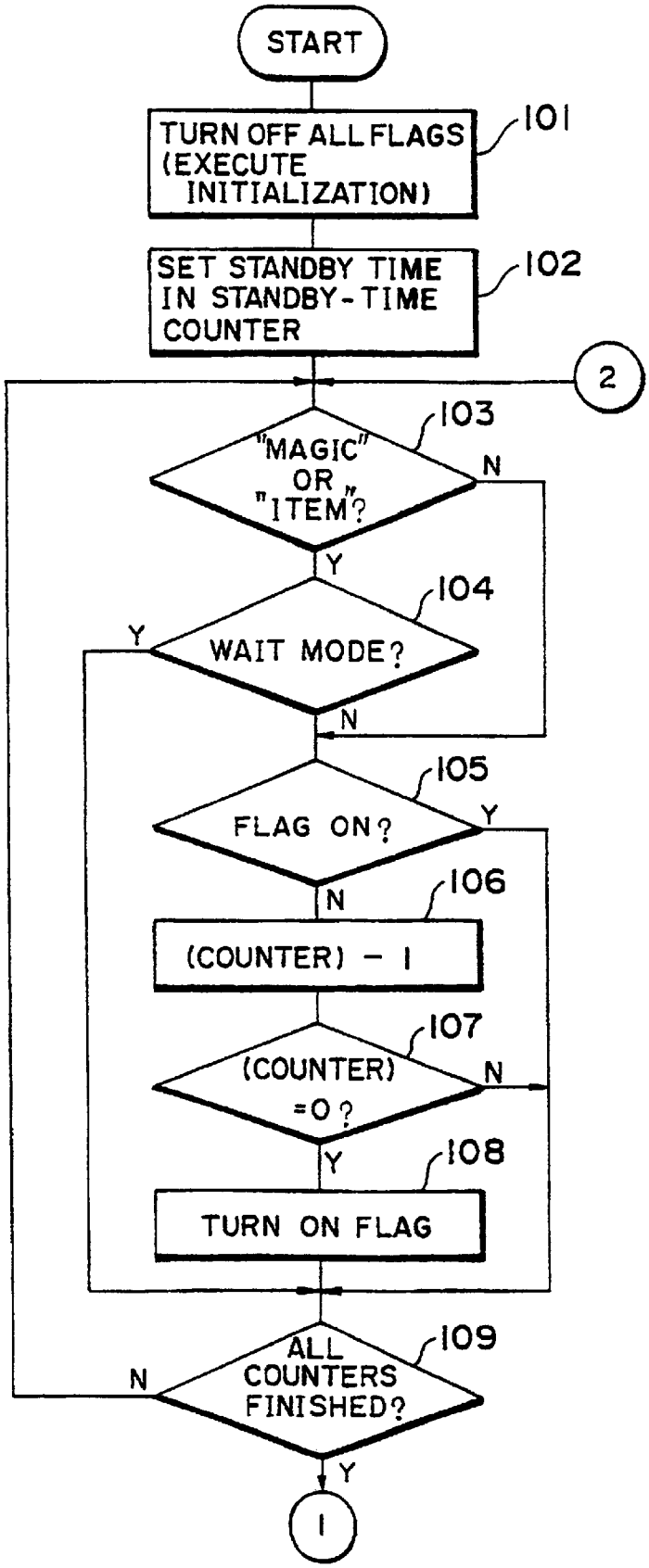
FIG. 7 is a flowchart showing counter decrementing processing.

The CPU 50 executes processing in accordance with the program that has been stored in the internal ROM 31 of memory cartridge 30. FIG. 7 mainly illustrates the part of this processing which relates to decrementing of the counters.

Step 101 in FIG. 7 is an initializing step, in which all of the flags accompanying the counters shown in FIG. 4*a* are turned off. Next, at step 102, a value representing standby time is calculated for every character, in conformity with the set battle speed, using the basic value of standby time and the agility coefficient, and the calculated value is set in the corresponding standby-time counter.

Based upon the flag area shown in FIG. 5*a,* it is determined at step 103 whether "magic" or "item" has been set. If the answer is NO, the program proceeds to step 105. If the answer is YES but it is found at step 104 (NO) that the prevailing mode is not the wait mode, the program proceeds to step 105. As long as the flag accompanying the standby-time counter is off (NO at step 105), the value in the standby-time counter is decremented at step 106. This processing is executed at a fixed time interval with regard to all of the standby-time counters until the value in the particular standby-time counter becomes zero (steps 107 and 109).

When the value in the standby-time counter becomes zero, the corresponding flag turns on (steps 107, 108).

If "MAGIC" or "ITEM" has been selected and the wait mode has been set (YES at step 103 and 104), the processing of steps 105 through 108 is skipped. Thus, in the wait mode, the passage of time stops in specific cases.

The processing of steps 103 through 109 is executed not only for the standby-time counters but also for the action preparation-time counters. That is, "all counters" mentioned in the block of step 109 refers to all of the standby-time counters and action preparation-time counters. Unless initial values are preset, the decrementing processing is essentially meaningless. Since it is unnecessary for the standby-time counter and action preparation-time counter for one character to operate simultaneously, it can be so arranged that one counter area is used alternately as the standby-time counter and action preparation-time counter. The counter decrementing processing of FIG. 7 can also be executed as processing based upon an interrupt at fixed times.

Figure 8:
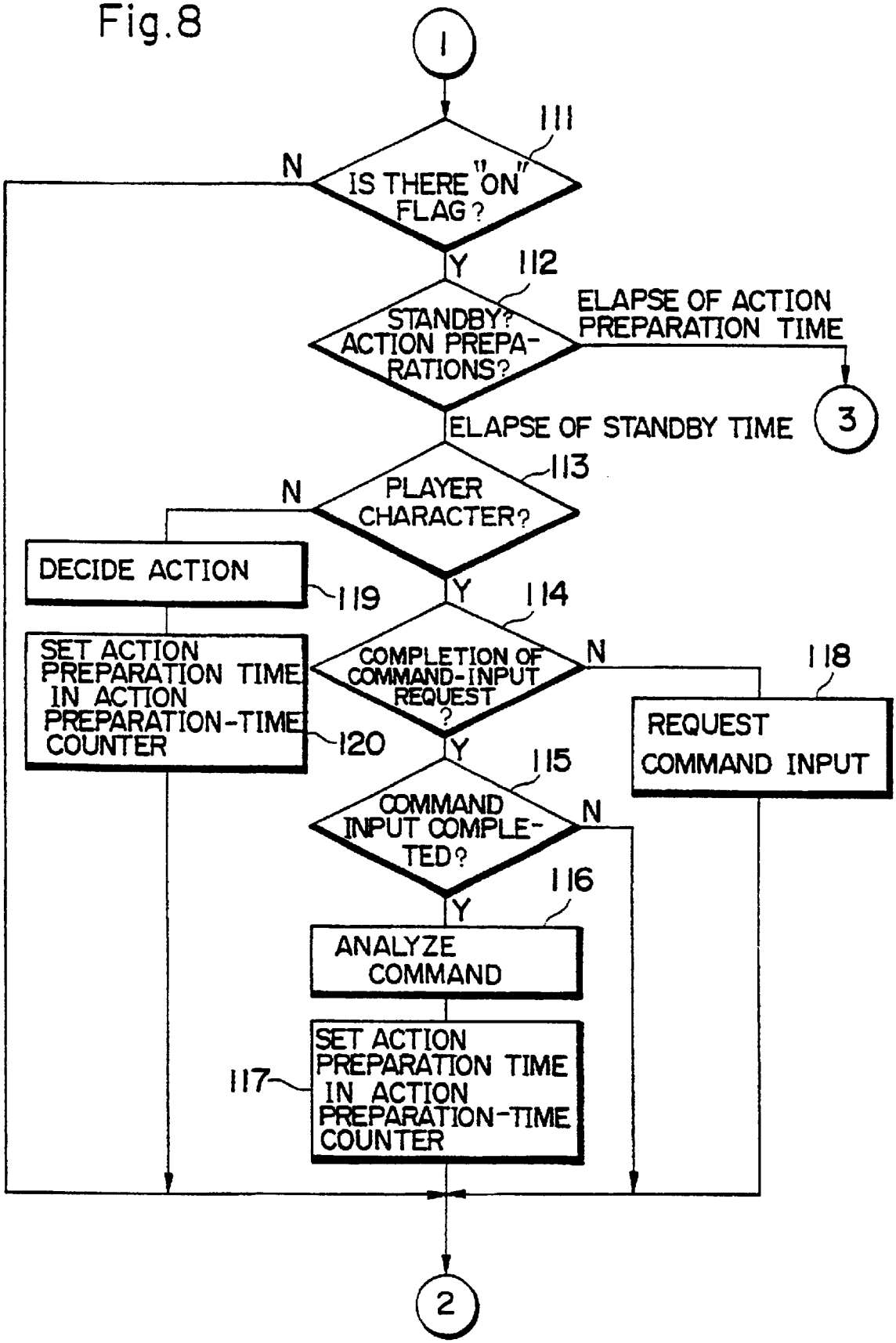
FIG. 8 is a flowchart showing flag control processing.

FIG. 8 mainly illustrates a flag-decision processing procedure executed by the CPU 50.

When any flag accompanying a counter is turned on (YES at step 111), it is determined at step 112 whether the flag is attached to a standby-time counter or a action preparation-time counter.

If the flag relates to standby-time counter, this means that the standby time has elapsed. It is then determined at step 113 whether the standby time has elapsed for a player character or enemy character. In a case where the standby time for a player character has elapsed (YES at step 113), the status of an input enable flag is checked and, if the fag is still off (NO at step 114), a screen requesting a command input is displayed and the input enable flag is turned on (step 118).

Figure 13:
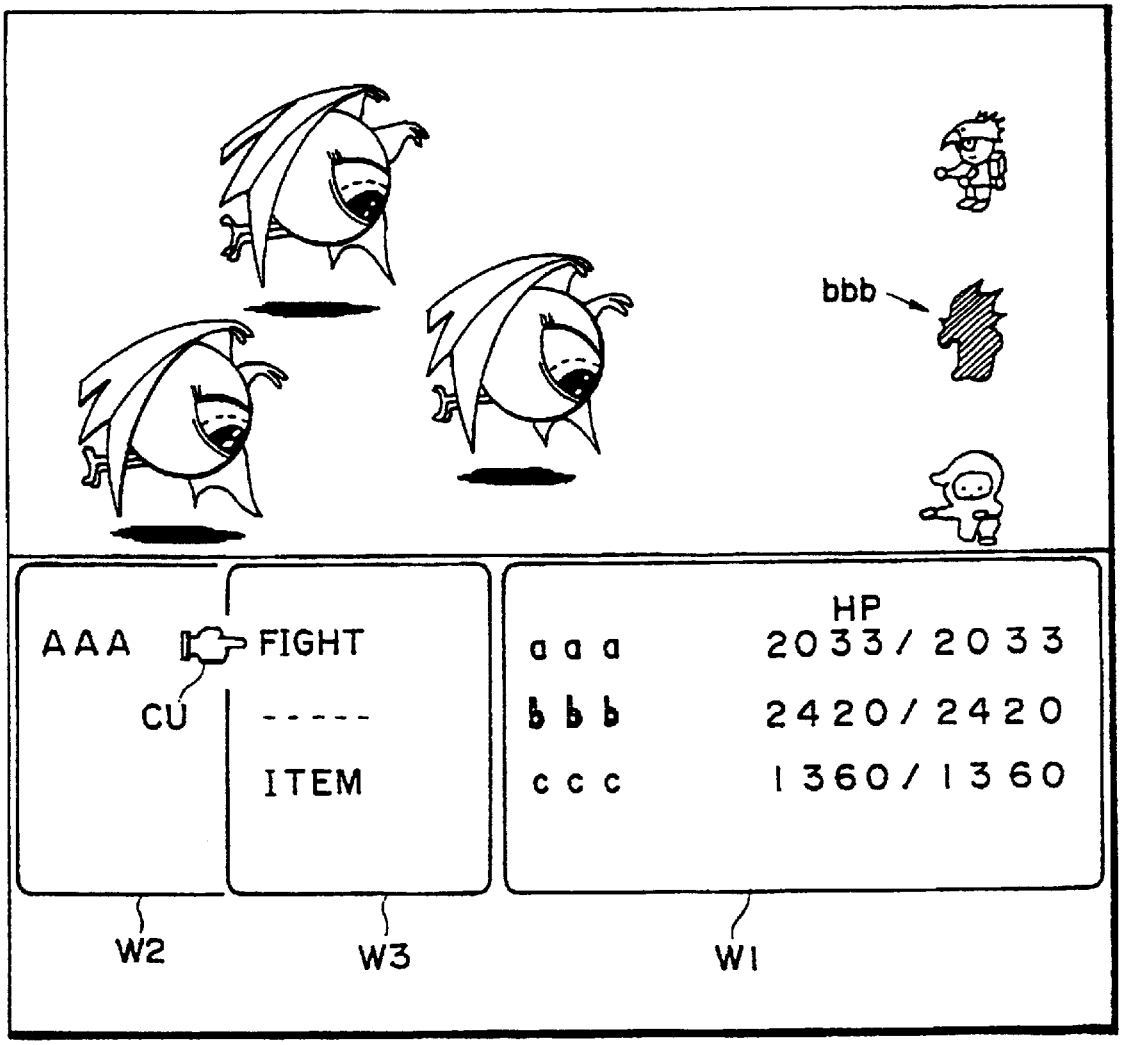
FIG. 13 is a diagram showing an example of a display screen presented on the display unit.

An example of the screen which request a command input is shown in FIG. 13. The display in this example is for a case where the standby time of the player character bbb has elapsed. The display of the player character bbb changes to a special form (e.g., the color of the character changes, the character flashes or emits light, etc., as indicated by the hatching in FIG. 13) and the alphabetic letters of the player character in the window 1 also changes to a special form (e.g., the letters change color or flash, etc., as indicated by the hatching in FIG. 13). Further, a window W3 opens, the type of command is displayed and the cursor CU appears at the position of window W2. Here "FIGHT" indicates the most common attack against an enemy character. "ITEM" means that a special form of attack can be selected. There are many other types of commands besides that mentioned above.

Figure 15:
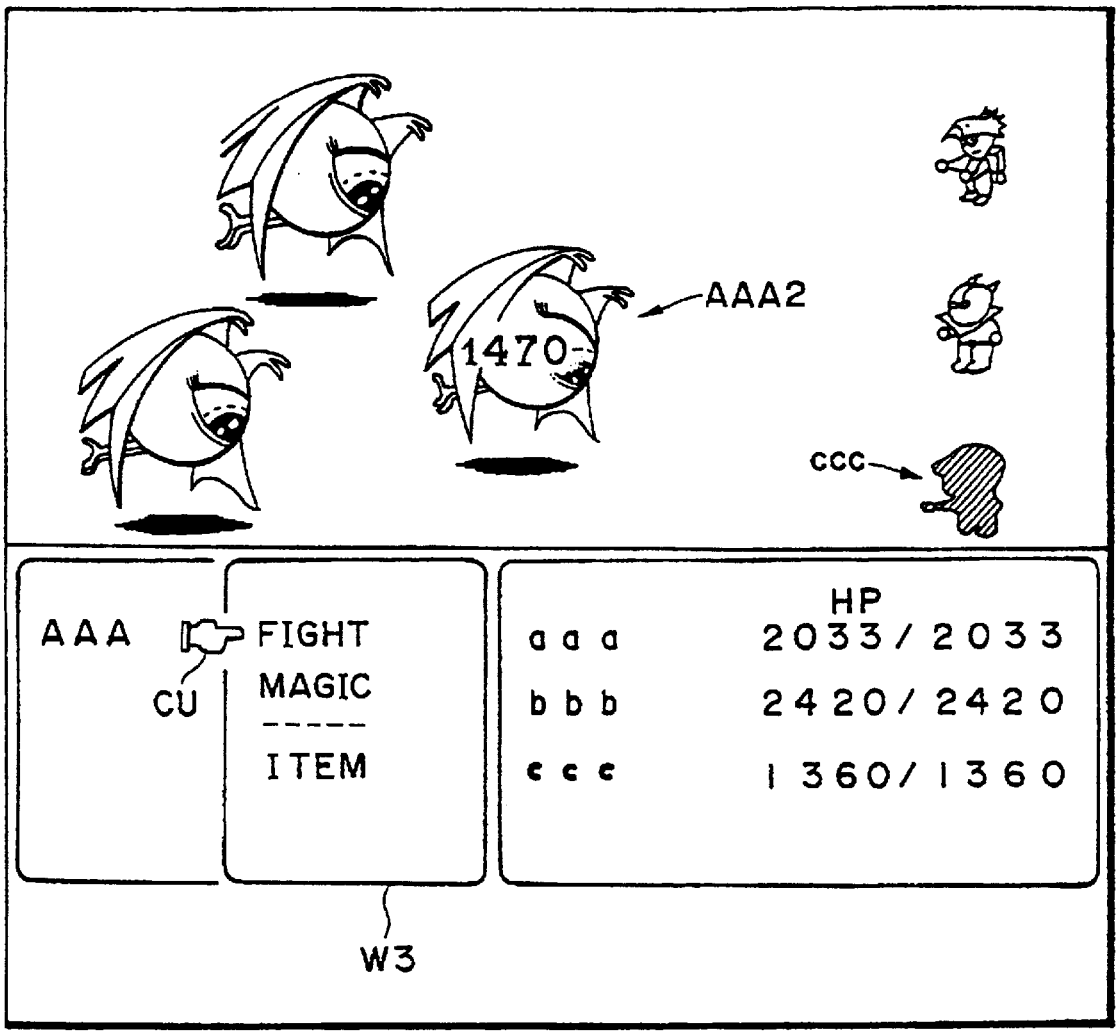
FIG. 15 is a diagram showing an example of a display screen presented on the display unit.

FIG. 15 illustrates an example of a display which prevails at elapse of the standby time for the player character ccc. Here "MAGIC" is added as the command displayed in the window W3. Thus, the type of attack that can be utilized differs depending upon the character.

Figure 19:
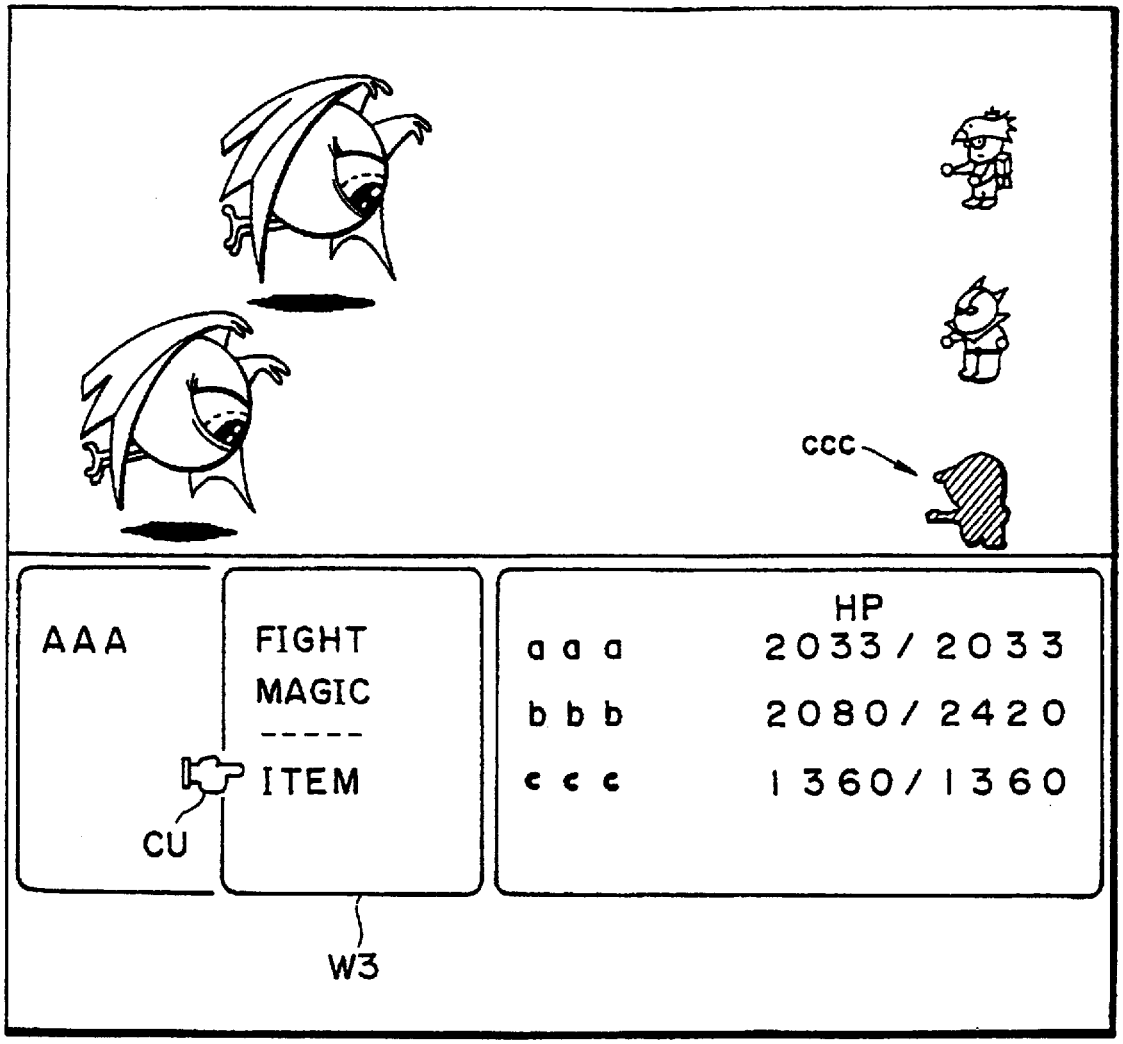
FIG. 19 is a diagram showing an example of a display screen presented on the display unit.
Figure 20:
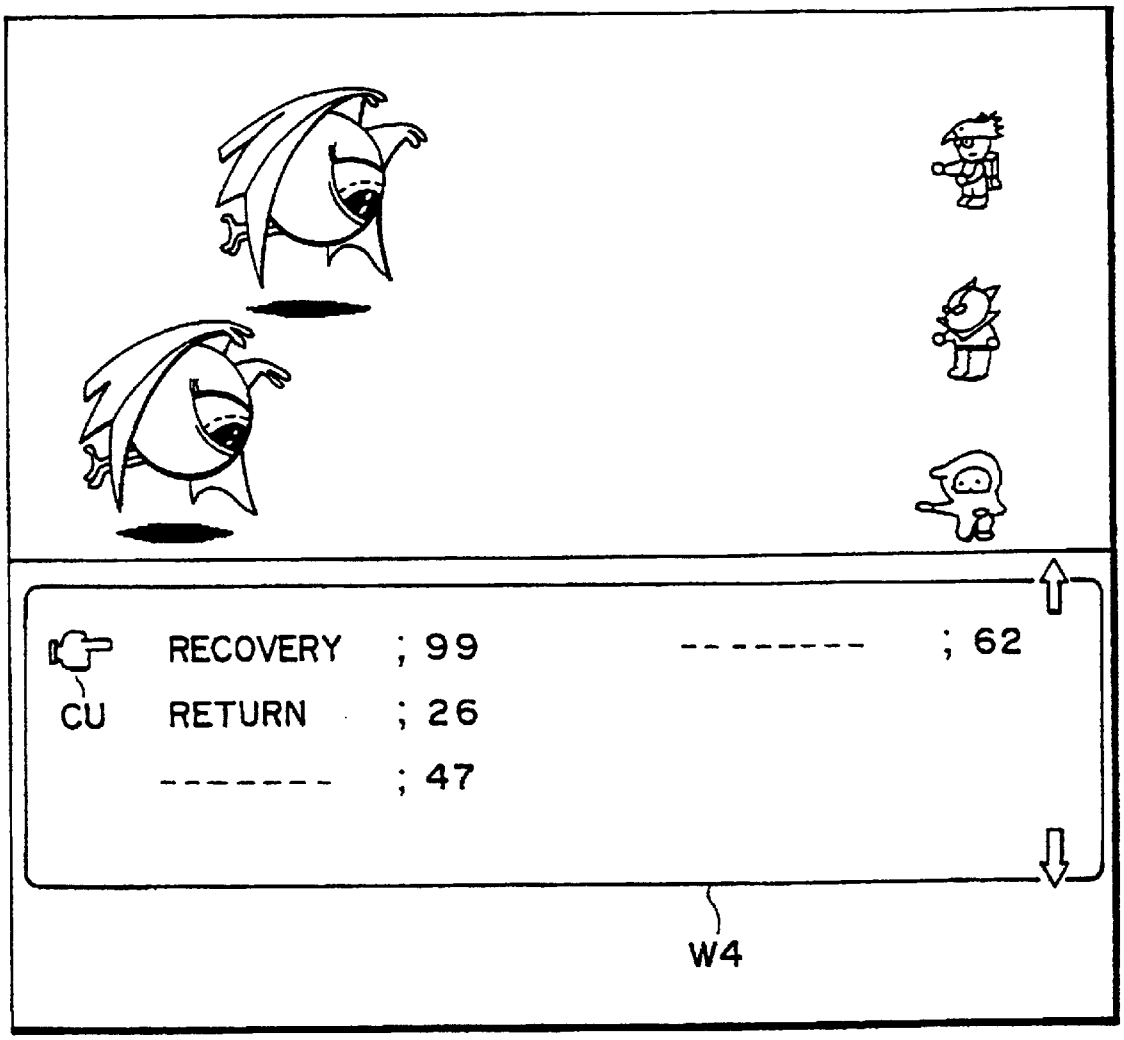
FIG. 20 is a diagram showing an example of a display screen presented on the display unit.

FIG. 19 also illustrates an example of a display which prevails at elapse of the standby time for the player character ccc. When the player character selects "ITEM", the display changes as shown in FIG. 20 so that a special attack or defense can be selected. A window W4 for selecting the contents of the item opens and "RECOVERY", "RETURN", etc., are displayed. "RECOVERY" means that the survivability of the corresponding player character is capable of being restored to the MAX value. "RETURN" means that another player character that has fainted because its hit points have become zero is capable of participating in combat once again. The numerals "99", "26" indicate the number of times these commands can be used. The up and down arrows on the right side of window W4 indicate that other items are capable of being selected by scrolling the window W4 up or down.

When such an item has been selected, the counting operation of the counter stops, as set forth earlier, if the present mode is the wait mode. The same is true when "MAGIC" has been selected.

With reference again to FIG. 8, it is determined at step 115 whether the input of the command has been completed if the command input has been allowed (YES at step 114). Input of a command is construed to have been completed when one command (with the exception of "ITEM" and "MAGIC") has been selected from window W3 or W4. The input of the command is performed by moving the cursor CU to the position of the desired command using the joy pad 27 and then pressing the A button 21.

Figure 14:
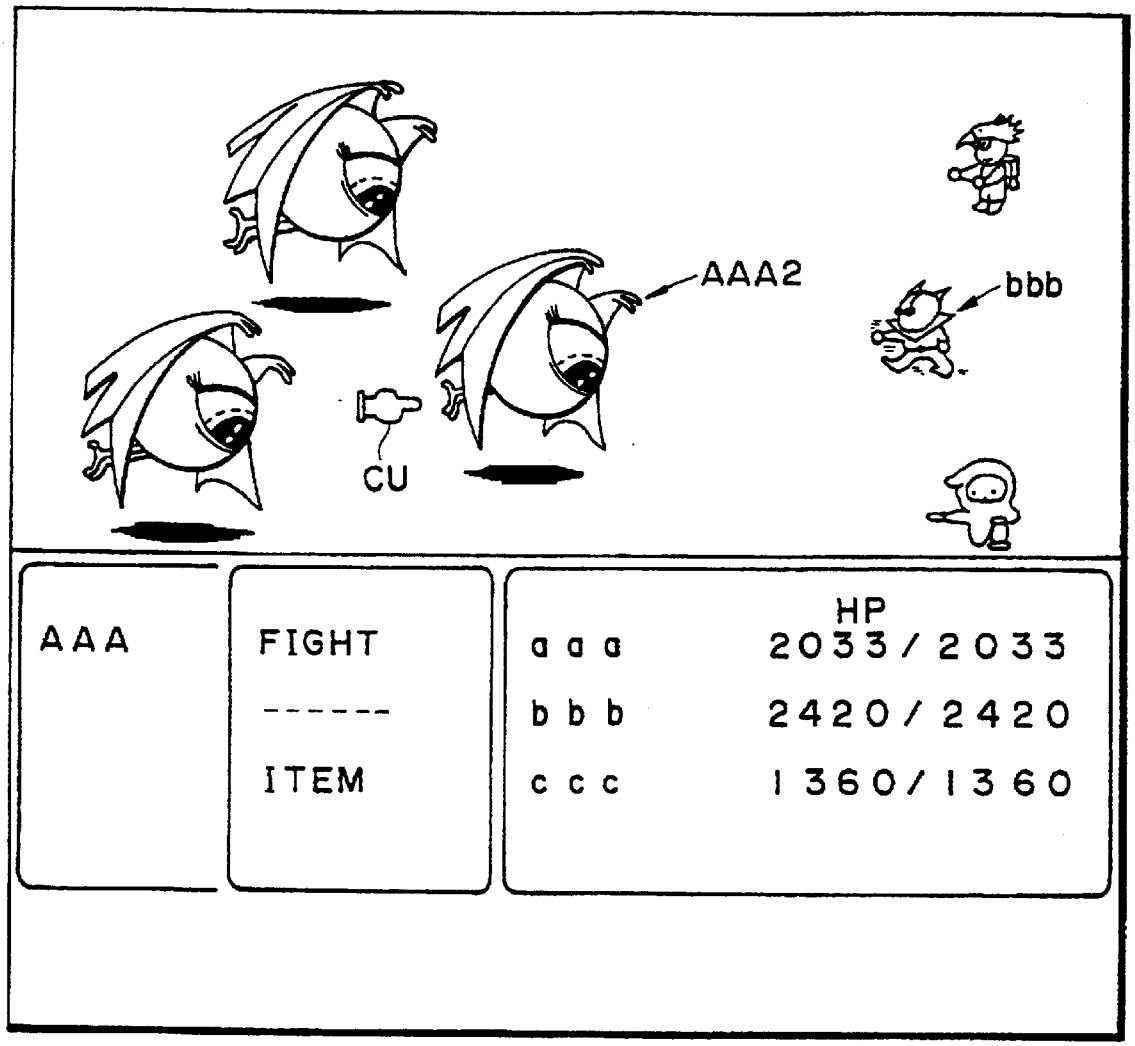
FIG. 14 is a diagram showing an example of a display screen presented on the display unit.

If a command is inputted, the command is analyzed at step 116. For example, when "ITEM or "MAGIC" has been selected, the display changes over to that shown in FIG. 20 in order that a specific command may be further selected. In the case of another command, the action preparation time conforming to this command is calculated using the data shown in FIG. 6*b* and this time is preset in the action preparation-time counter for this character at step 117. This action preparation-time counter is decremented by the processing shown in FIG. 7. When a command is inputted, the display changes from that shown in FIG. 13 to that shown in FIG. 14. Here the player character bbb assumes a state in which it is prepared to attack. The cursor CU is displayed in order to select which enemy character to attack. The player moves the cursor to the position of the desired enemy character and then presses the A button 21 so that the enemy character to be attacked can be designated.

In a case where the standby time for an enemy character has elapsed (NO at step 113), the action (attack) of this enemy character is decided at step 119 and the action preparation time for the action that has been decided is preset in the action preparation-time counter of this enemy character at step 120. In general, the action of the enemy character is decided depending upon the type of the enemy character. However, when there is a change, such as a reduction in the number of enemy characters, action for carrying out a stronger attack is set.

Figure 9:
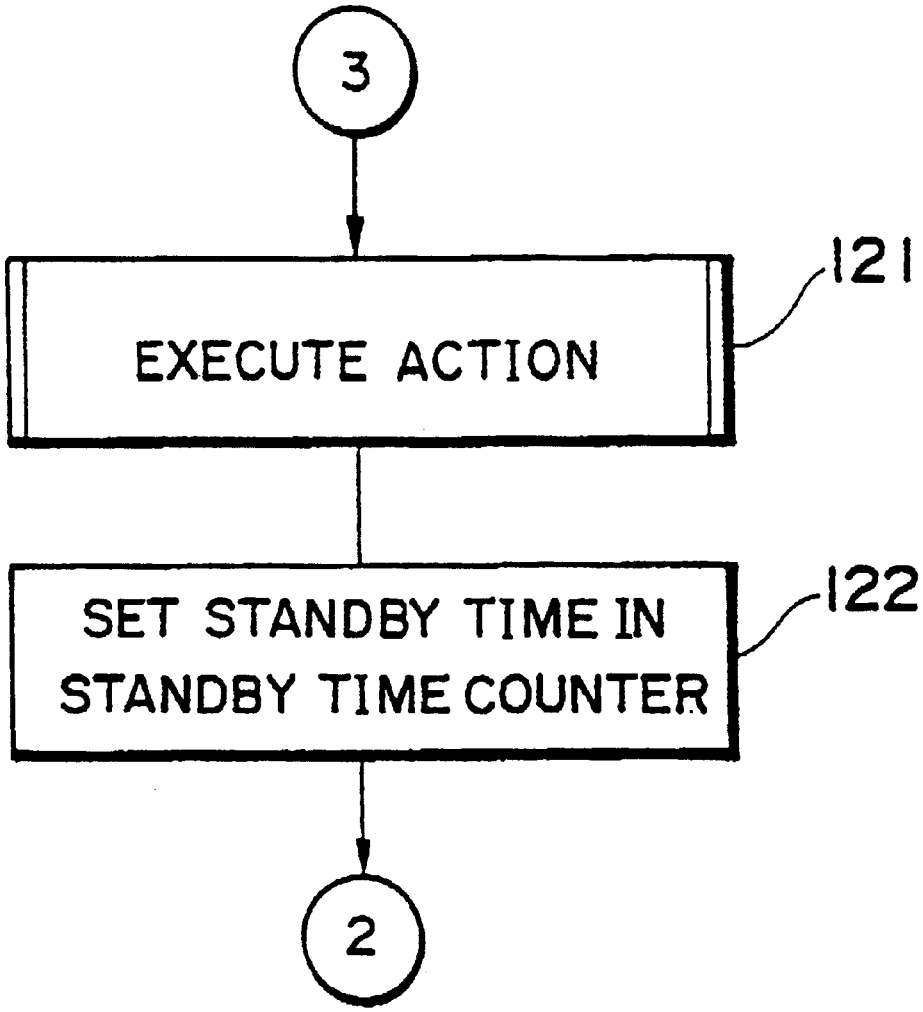
FIG. 9 is a flowchart showing action execution processing.

In a case where a flag that has been turned on is one attached to a action preparation-time counter (step 112), processing proceeds to action processing shown in FIG. 9.

Figure 16:
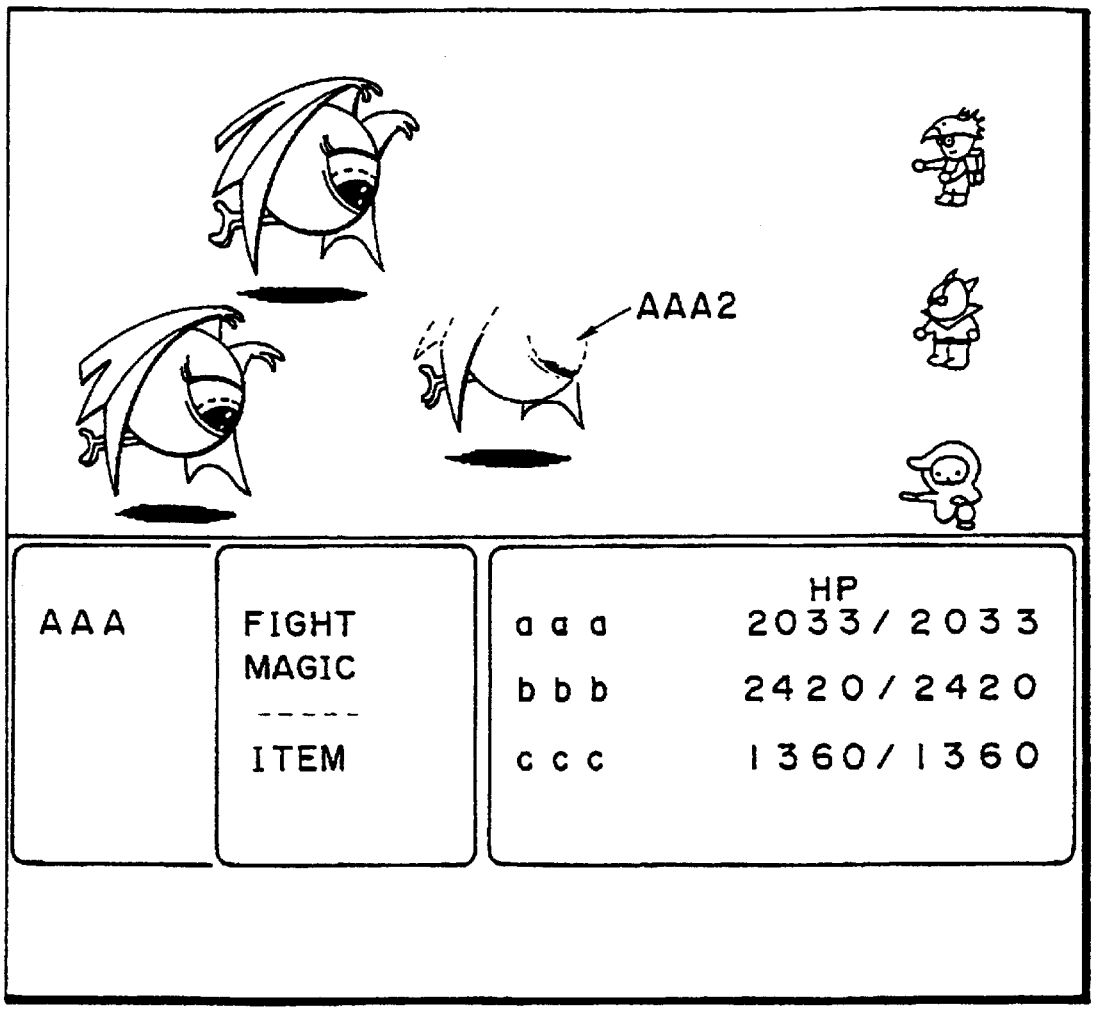
FIG. 16 is a diagram showing an example of a display screen presented on the display unit.
Figure 17:
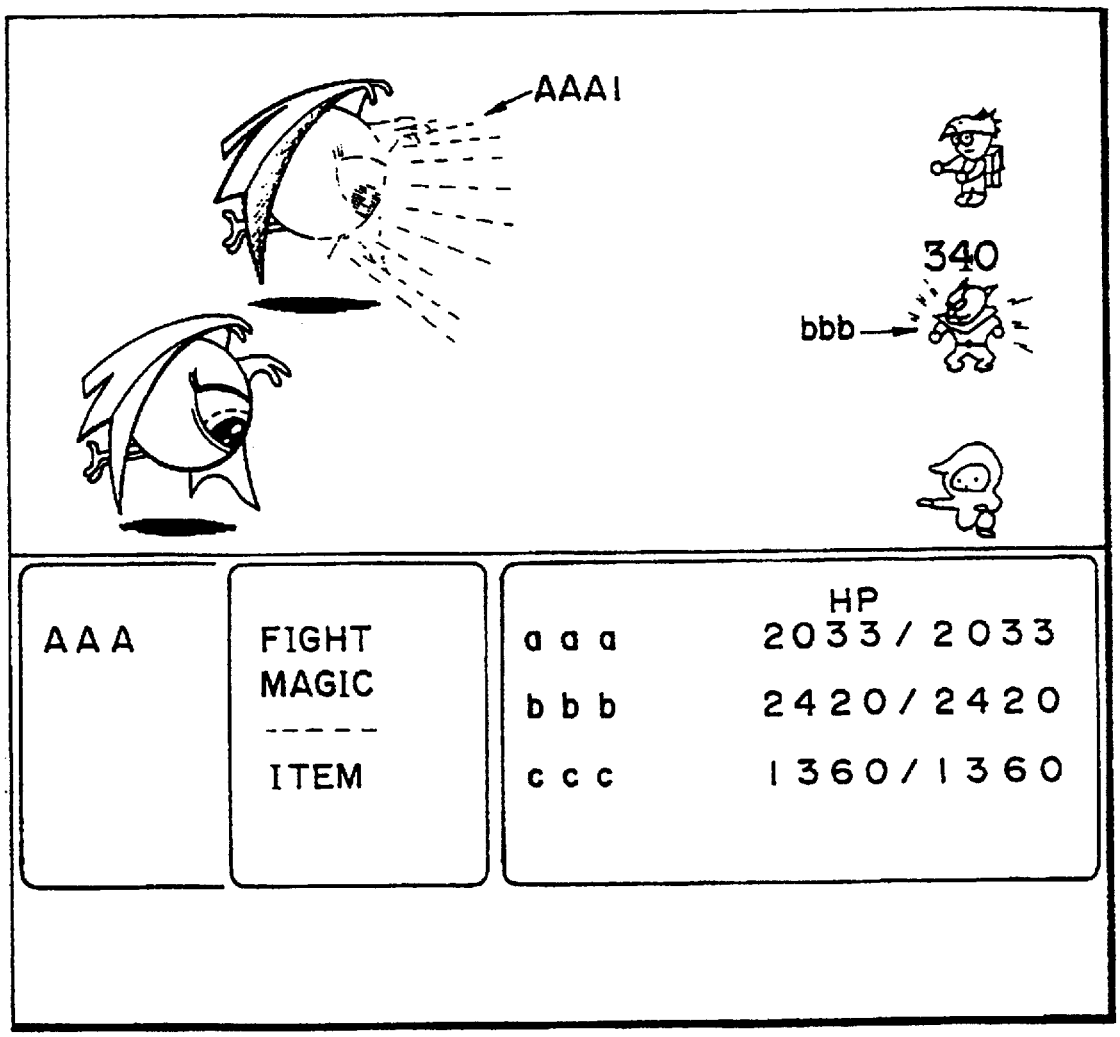
FIG. 17 is a diagram showing an example of a display screen presented on the display unit.
Figure 18:
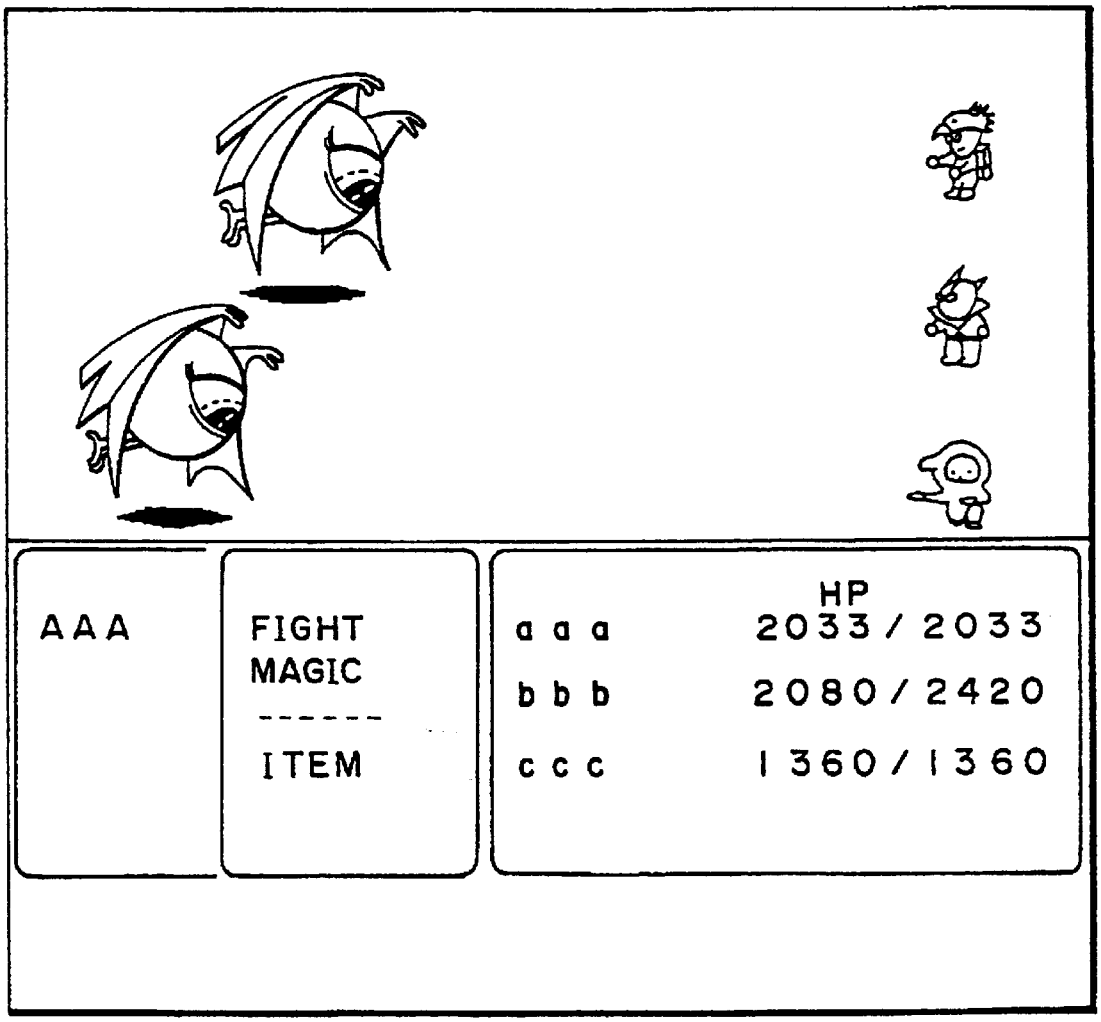
FIG. 18 is a diagram showing an example of a display screen presented on the display unit.

In FIG. 9, it is shown that action execution processing includes display-screen processing, hit-point computation (subtraction) and processing for turning off the command-input completion flag. For example, since the enemy character AAA2 has been attacked by the player character bbb, the enemy character AAA2 is decremented by 1470 points, as shown in FIG. 15. Since the hit points of the enemy character AAA2 become zero (or a negative number) owing to the score decrementing operation, the enemy character AAA2 vanishes from the screen, as shown in FIG. 16. In a case where the enemy character AAA1 attacks the player character bbb, the enemy character AAA1 emits light and the player character bbb, which has sustained damage as a result of the attack, has its score reduced by 340 points, as illustrated in FIG. 17. As a result, the hit points of the player character bbb become 2420−340=2080 as shown in FIG. 18.

Thereafter, the standby time of the character which has executed an action (which has performed an attack, etc.) is present in the standby-time counter for this character as step 122.

Figure 10:
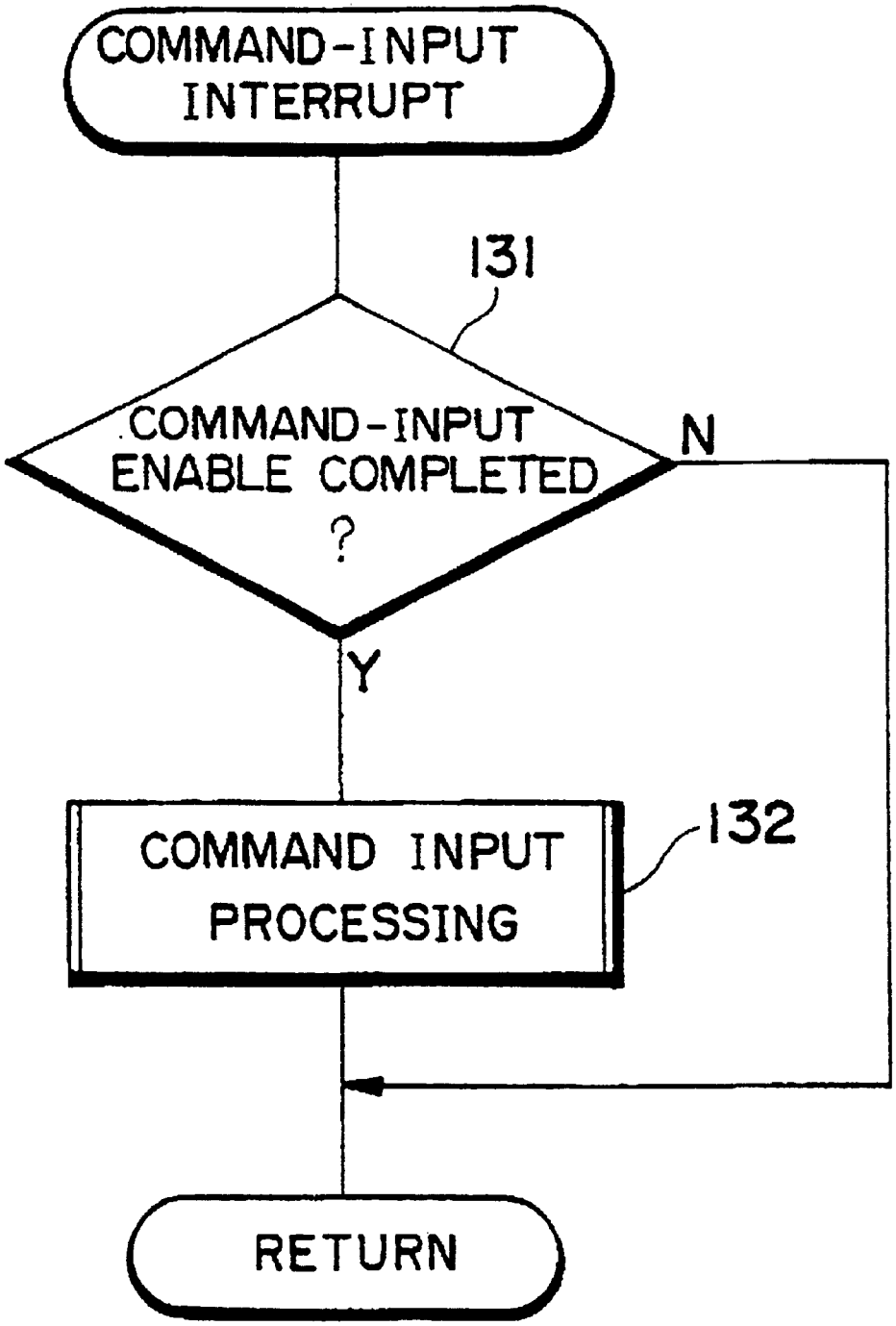
FIG. 10 is a flowchart showing command-input interrupt processing.

FIG. 10 illustrates interrupt processing executed when a player inputs a command. When it has been confirmed that the flag which enables input of a command has been turned on (YES at step 131), the program proceeds to command input processing at step 132.

For example, when a command input other than "ITEM" and "MAGIC", such as the "FIGHT" command, has been inputted, this command is stored in the input-command area (FIG. 4*b*), the command-input enable flag is turned off and the command-input completion flag is turned.

In the case of the "ITEM" or "FIGHT" input, a flag to this effect is turned on. Thereafter, when the specific command for "ITEM" or "FIGHT" is inputted, the input-enable flag and the "FIGHT" or "ITEM" flag are turned off, the inputted command is stored and the command-input completion flag is turned on.

As many apparently widely different embodiments of the present invention can be made without departing from the spirit and scope thereof, it is to be understood that the invention is not limited to the specific embodiments thereof except as defined in the appended claims.

What is claimed is:

1. A memory cartridge for program control of a computer for a video game including a CPU for executing processing in accordance with a program, a memory for use during program execution by said CPU, a display processing unit for displaying a game video screen on a display unit under control of said CPU, and an input unit for inputting action commands;

said memory cartridge storing a program, said program including instructions for:

causing the display unit to display a player character and an enemy character on a display screen, causing the player character to execute an action commanded in response to an action command inputted from said input unit, causing the enemy character to execute a predetermined action, causing a counter associated with each player and enemy character, to count a time, which is assigned to each of the player and enemy characters, from an end of said commanded action and said predetermined action of each of the player and enemy characters, respectively, causing said counter to generate a signal for each of the enemy and player characters when the time counted is equal to the time assigned thereto, in response to said generated signal, allowing said input unit to input the action command for the player character, and proceeding to execution of the action in accordance with the inputted action command, and in response to said generated signal, processing the predetermined action in accordance with a predetermined action schedule for the enemy character.

2. A memory cartridge according to claim 1, wherein the program stored in the memory cartridge, and executed by said CPU includes further instructions for:

causing said display screen to display a command input request requesting input of an action command indicating a type of action, causing a counter to count a predetermined time for action preparation conforming to the type of action in response to the input action command, and executing the commanded action when the time for action preparations elapses.

3. A memory cartridge according to claim 1, wherein the program stored in the memory cartridge, and executed by said CPU includes further instructions for:

causing a counter to count a predetermined time for action preparations conforming to an action in accordance with a predetermined action schedule for the enemy character, and executing the action for the enemy character in accordance with the predetermined action schedule when the time for the action preparations elapses.

4. A memory cartridge according to claim 1, wherein an active mode and a wait mode are provided, and wherein the program stored in the memory cartridge, and executed by said CPU includes further instructions for:

when said active mode has been selected, activating the instructions for causing the counters associated with the player and enemy characters to count, and when the wait mode has been selected, deactivating the instructions for causing the counters associated with the player characters to count.

5. A memory cartridge according to the claim 1, wherein the program stored in the memory cartridge, and executed by said CPU includes further instructions for changing a speed of counting the time assigned to each character in response to an input designating the speed of the passage of time.

6. A memory cartridge for program control of a computer for a video game having a CPU for executing processing in accordance with a program, a memory for use during program execution by said CPU, a display processing unit for displaying a game video screen on a display unit under control of said CPU, and an input unit for inputting action commands, the video game including characters comprising enemy and player characters, said memory cartridge storing a program, the program including instructions for:

causing a counter to clock a time, which is assigned to each of the enemy characters, from an end of a previous attack of one of the characters irrespective of input of the action command for the player character, causing the counter to generate a signal for the one of the characters when the time clocked is equal to or greater than a predetermined time assigned to the one of the characters, and in response to said generated signal, processing an action in accordance with a predetermined action schedule if the one of the characters is an enemy character.

*7. A computer-readable medium carrying one or more sequences of one or more instructions for a video game operable on a computer, the one or more sequences of one or more instructions including instructions which, when executed by the computer, cause the computer to perform the steps of:*

*displaying a player character and an enemy character on a display screen,*

*causing the player character to execute, on the display screen, an action commanded in response to an accepted command,*

*causing the enemy character to execute, on the display screen, a predetermined action,*

*causing a counter associated with each player and enemy character, to count a time, which is assigned to each of the player and enemy characters, from an end of the commanded action and the predetermined action of each of the player and enemy characters, respectively,*

*causing the counter to generate a signal for each of the enemy and player characters when the time counted is equal to the time assigned thereto,*

*allowing acceptance of an input of the action command for the player character responsive to the generated signal, and*

*proceeding to execution of the action in accordance with the accepted action command, and*

*processing the predetermined action in accordance with the predetermined action schedule for the enemy character, responsive to the generated signal.*

*8. The computer-readable medium according to claim 7, wherein the one or more sequences of one or more instructions cause the computer to further perform the steps:*

*displaying a command input request requesting input of an action command indicating a type of action on the display screen,*

*causing a counter to count a predetermined time for action preparation conforming to the type of action in response to the input action command and*

*executing the commanded action when the predetermined time for action preparations elapses.*

*9. The computer-readable medium according to claim 7, wherein one or more sequences of one or more instructions cause the computer to further perform the steps:*

*causing a counter to count a predetermined time for action preparations conforming to an action in accordance with a predetermined action schedule for the enemy character, and*

*executing the action for the enemy character in accordance with the predetermined action schedule when the predetermined time for the action preparations elapses.*

*10. The computer-readable medium according to claim 7, wherein an active mode and a wait mode are provided, and wherein the one or more sequences of one or more instructions cause the computer to further perform the steps:*

*activating the instructions for causing the counters associated with the player and enemy characters to count, when the active mode has been selected, and*

*deactivating the instructions for causing the counters associated with the player characters to count when the wait mode has been selected.*

*11. The computer-readable medium according to claim 7, wherein the one or more sequences of one or more instructions cause the computer to further perform a step of changing a speed of counting the time assigned to each character in response to an input designating the speed of the passage of time.*

*12. A computer-readable medium carrying one or more sequences of one or more instructions for a video game operable on a computer, the video game including characters comprising enemy and player characters, the one or more sequences of one or more instructions including instructions which, when executed by the computer, cause the computer to perform the steps of:*

*causing a counter clock a time, which is assigned to each of the enemy characters, from an end of a previous attack of one of the characters irrespective of input of the action command for the player character,*

*causing the counter to generate a signal for the one of the characters when the time clocked is equal to or greater than a predetermined time assigned to the one of the characters, and*

*processing an action in accordance with a predetermined action schedule if the one of the characters is an enemy character, in response to the generated signal.*

* * * * *